US006741273B1

(12) United States Patent
Waters et al.

(10) Patent No.: US 6,741,273 B1
(45) Date of Patent: May 25, 2004

(54) VIDEO CAMERA CONTROLLED SURROUND SOUND

(75) Inventors: Richard C. Waters, Concord, MA (US); Franklin J. Russell, Jr., Grafton, MA (US)

(73) Assignee: Mitsubishi Electric Research Laboratories Inc, Cambridge, MA (US)

( * ) Notice: Subject to any disclaimer, the term of this patent is extended or adjusted under 35 U.S.C. 154(b) by 0 days.

(21) Appl. No.: 09/368,603

(22) Filed: Aug. 4, 1999

(51) Int. Cl.$^7$ .......................... H04N 9/47; G06F 17/00; H04R 5/02

(52) U.S. Cl. .......................... 348/61; 700/94; 381/307

(58) Field of Search .......................... 348/61, 64, 738, 348/169, 462, 484, 722; 382/103; 381/307, 107, 98; 700/94; 84/662

(56) References Cited

U.S. PATENT DOCUMENTS

| | | | | | |
|---|---|---|---|---|---|
| 4,254,303 | A | * | 3/1981 | Takizawa | 381/107 |
| 5,548,346 | A | * | 8/1996 | Mimura et al. | 348/738 |
| 5,798,922 | A | | 8/1998 | Wood et al. | 364/400 |
| 5,892,538 | A | | 4/1999 | Gibas | 348/42 |
| 5,912,980 | A | | 6/1999 | Hunke | 382/103 |
| 6,408,079 | B1 | * | 6/2002 | Katayama et al. | 381/98 |
| 6,556,687 | B1 | * | 4/2003 | Manabe | 381/387 |

FOREIGN PATENT DOCUMENTS

| | | | | |
|---|---|---|---|---|
| DE | 4027338 A1 | * | 3/1992 | H04R/5/04 |

OTHER PUBLICATIONS

Mitsubishi Electric, Inc., "Artificial Retina"; Part No. M64283FP, Semiconductor Technical Data.

Mitsubishi Electric, Inc., "Single Chip CMOS Microcomputer"; Part No. M32000D4AFP.

* cited by examiner

*Primary Examiner*—Gims Philippe
(74) *Attorney, Agent, or Firm*—Dirk Brinkman; Andrew Curtin

(57) ABSTRACT

A system for adjusting delivery of sound to loudspeakers in a home theater includes a plurality of loudspeakers located in an area. The loudspeakers are coupled to a sound generating source. A camera is oriented to acquire images of the area. An image processing system and controller is coupled to the camera and the sound generating source. Image processing system identifies the positions of the speakers and a position of the listener in the area from the images. The controller adjusts the deliver of the sound according to the relative positions of the loudspeakers and the listener.

13 Claims, 2 Drawing Sheets

VIDEO CAMERA CONTROLLED SURROUND SOUND

FIELD OF THE INVENTION

The field of the invention pertains to multiple audio loudspeakers to realistically recreate the direct and ambient sound of an audio only, or an audio visual work such as a movie or television program and, in particular, in a home theater setting to provide sound from all directions to the viewer-listener, and more particularly, this invention relates to automatically adjusting the sound delivered to loudspeakers according to the relative location of the loudspeakers and the listener.

BACKGROUND OF THE INVENTION

Despite the improvements in the overall sound quality provided by sophisticated stereophonic sound systems, many consumers believe contemporary sound systems lack the sense of sonic realism associated with live sound. Sound reproduction systems, while meeting quantitative acoustic performance criteria relative to frequency response, distortion, and dynamic range, can subjectively evoke a wide range of listener perceptions of sonic realism from a qualitative point of view.

Some sound systems achieve an enhanced spatial quality to reproduced sound, while avoiding the introduction of sonic artifacts that would detract from the overall sonic experience. The concept can be yet further extended by spatially distributing a substantial number of point sources for reproducing sound in a listening environment to further increase the perceived spaciousness.

While adding a multiplicity of spatially distributed point sources of sound can increase the perception of spaciousness, it also can produce an exaggerated, overblown spatial presentation that lacks realism. Such unnatural sound reproduction often causes the listener to experience acoustic fatigue. Thus, enhanced spaciousness must balance with the perceived acoustic realism of the resulting sound field in order to completely satisfy the listener.

This balance is particularly important in home theater sound systems where the acoustic requirements for this application differ from those for sound reproduction of stereo music. The key objectives for a home-theater sound system are to establish a convincing surround sound acoustic atmosphere based on ambience and sound effect audio signals captured in the soundtrack; maintain a stereo image panorama of sound in front of the viewer; and reproduce dialog that remains localized to the video screen for any location of the listener.

In essence, satisfactory acoustic performance results when the listener is immersed in a sound field having a three-dimensional spatial quality perceived as authentic in relation to the visual presentation on the video screen. Initial attempts to produce home theater sound included placing a pair of traditional loudspeakers on either side of a centrally located video display.

Such systems improved upon the sound of loudspeakers included within the typical television set. However, the performance of such systems was determined to be unacceptable in the marketplace for at least two reasons. First, listeners located off the center line between the two loudspeakers will not localize dialog to the screen, i.e., perceive the dialog to be solely coming from the screen. Dialog is typically recorded equally in both the left and right channels signals. Localization of dialog will be a point equidistant between the two loudspeakers for a listener on the centerline between the loudspeakers. As a listener moves off the center line, the listener will move closer to one loudspeaker and farther away from the other.

Localization of dialog will shift to the direction from which the first arriving signal originates. This will be the closest loudspeaker. Dialog collapses to the near loudspeaker as a listener moves off axis. The localization of dialog will be displaced from the location of the video image for off axis listeners, and the illusion that the characters on screen are actually speaking for off axis listeners will be destroyed. Second, a pair of stereo loudspeakers located on either side of the visual display confines the sound field to the space in front of the listener, in the plane of the loudspeakers. There is, thus, no sense of immersion—a sense that sound events occur to the side or behind the listener as well as in front of the listener.

Thus, there remains a need for a home theater surround sound loudspeaker system which operates using relatively simple components having mass market appeal at a reasonable cost. Of particular importance in these systems is the desirability that they present a consistent ambient sound field that automatically adjusts for audience location.

SUMMARY OF THE INVENTION

The invention provides a system and method for adjusting sound delivery in a home theater.

The system includes a plurality of loudspeakers located in an area. The loudspeakers are coupled to a sound generating source. A camera is oriented to acquire images of the area. An image processing system is coupled to the camera and the sound generating source. Image processing system identifies the positions of the speakers and the position of a listener in the area from the images. The image processing system uses the positional information to automatically adjust the sound to reflect the relative positions of the loudspeakers and the listener.

DETAILED DESCRIPTION OF THE PREFERRED EMBODIMENT

Figure 1:
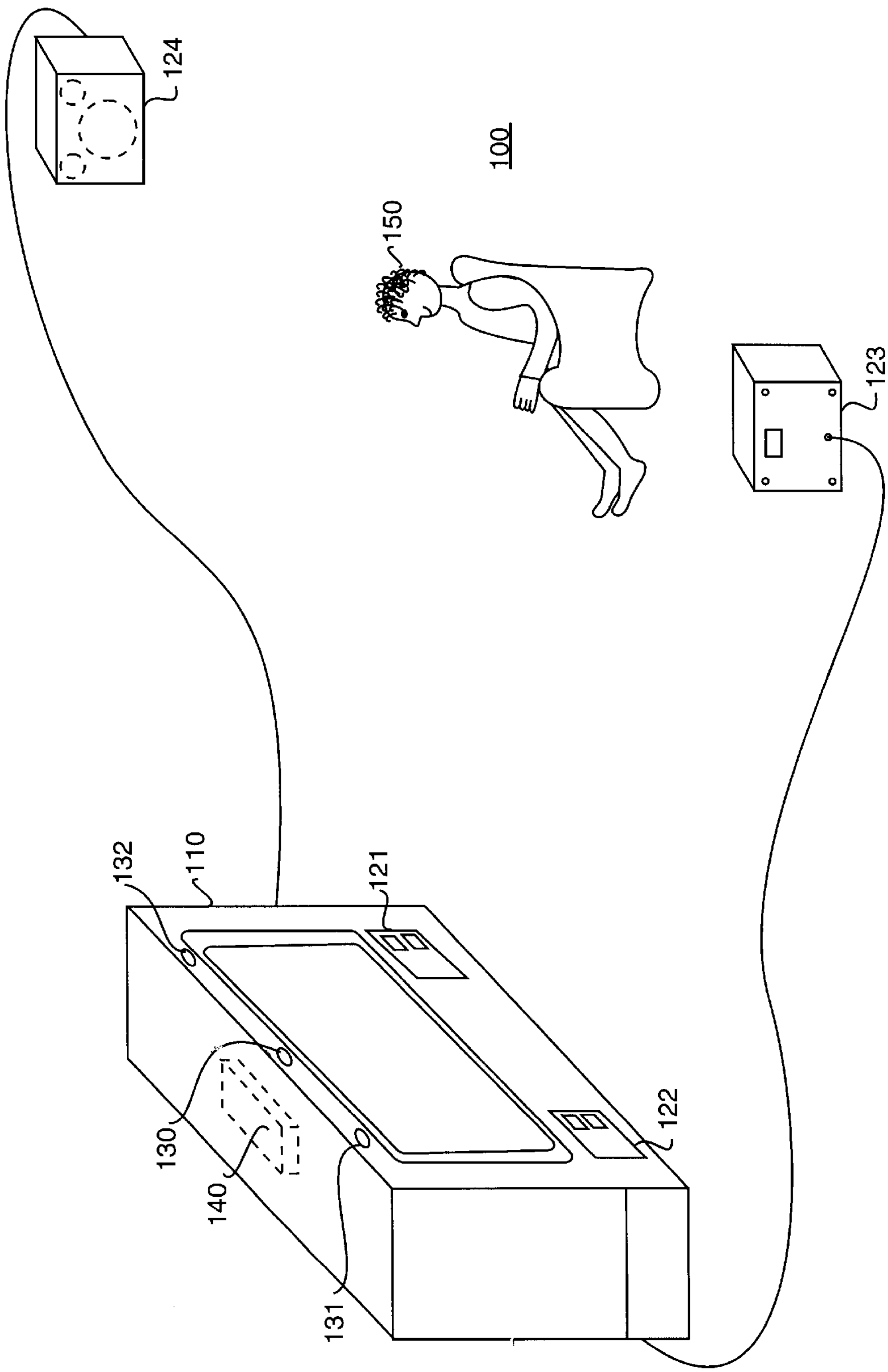
FIG. 1 is a diagram of a home theater according to the invention.
Figure 2:
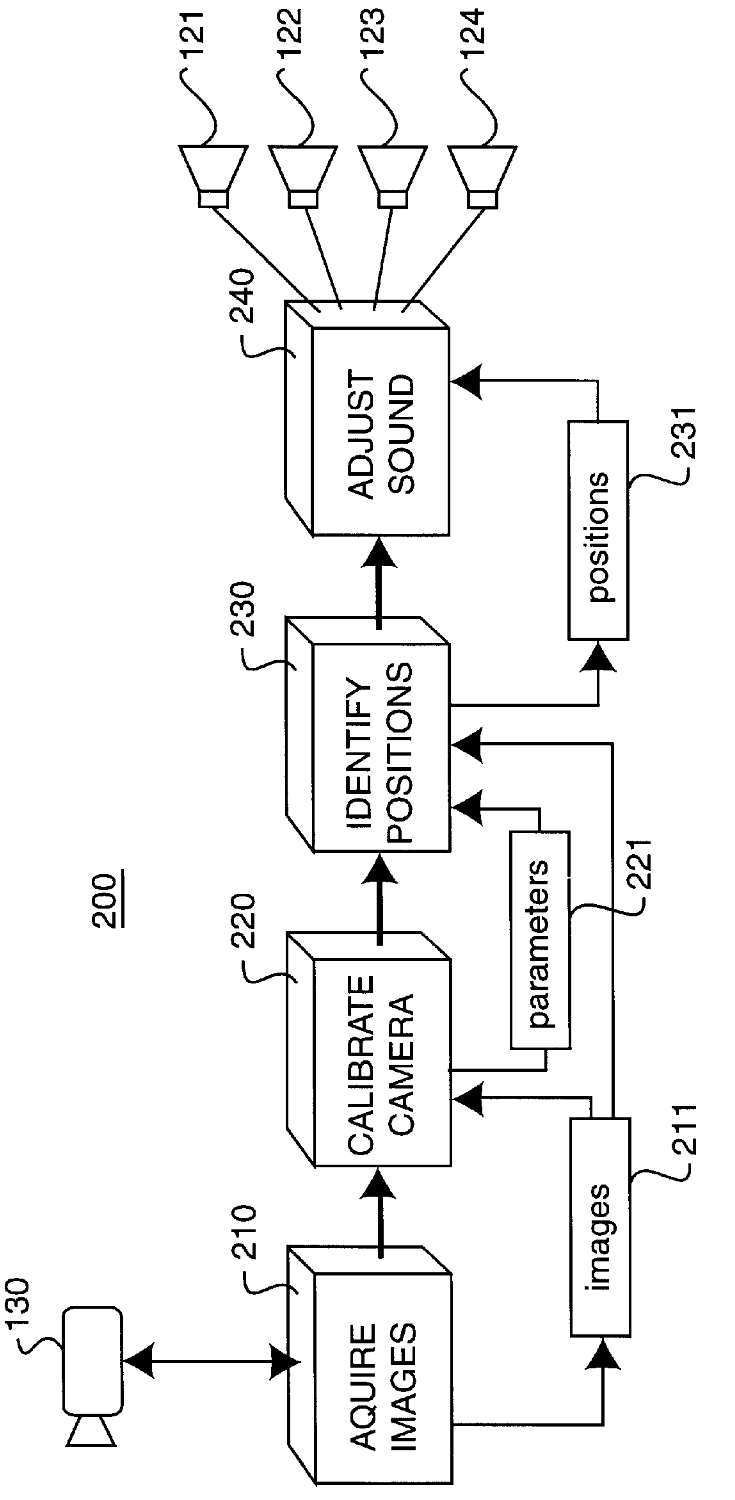
FIG. 2 is a flow diagram of a method for automatically adjusting sound in the home theater of FIG. 1 according to the position of a listener.

FIG. 1 shows a home theater system 100 according to the invention. FIG. 2 shows a method 200 for automatically adjusting the delivery of sound in the home theater 100. The home theater system 100 includes a video display unit (TV) 110, and multiple surround sound loudspeakers 121–124.

With a Dolby™ digital surround, the system 100 would have six speakers:

one on top of the TV, two to the left and the right of the TV, two behind the listener to the left and right, Each of the speakers produces a unique sound the content is compatible with Dolby.

A video camera 136 acquires (210) images 211 of an area of interest. The images 211 are processed by a controller 140. Using conventional image processing techniques, the controller 140 identifies (230) the positions 231 of the loudspeakers and a person 150 in the area of interest, see for example, U.S. Pat. No. 5,912,980 "Target acquisition and tracking" issued to Hunke on Jun. 15, 1999, incorporated herein by reference.

The camera 130 can be a Mitsubishi Electric Inc. "artificial retina" (AR), part number M64283FP. The AR is a CMOS image sensor of 128×128 pixels, which supports image-processing functions and includes an analog signal calibration. The device allows information compression and parallel processing like a human retina. M64283FP can achieve high performance, a compact system and low power consumption for the image-processing apparatus.

The controller 140 can be a Mitsubishi Electric Inc. single chip CMOS microcomputer, part number M32000D4AFP. The chip includes a 32-bit processor and 2 MB of DRAM and a 4 KB bypass cache.

The camera and controller together can be obtained for tens of dollars satisfying the need for relatively simple components having mass market appeal at a reasonable cost.

In general, proper calibration (220) is a key issue. The controller 140 needs to determine the position of the listener 150 with considerable accuracy, and needs to know the position and orientation of the loudspeakers 121–124 as well. If a single camera is used the camera must be calibrated (220). Alternatively, multiple cameras 132 can be used to determine three-dimensional positional information without knowing the camera parameters 221, see U.S. Pat. No. 5,892,538 "True three-dimensional imaging and display system" issued to Gibas on Apr. 6, 1999, incorporated herein by reference. In other words, the system is self-calibrating.

The controller 140 uses the positional information 231 to adjust (240) the sound delivered to the loudspeakers 121–124 to be properly balanced for the relative location of the loudspeaker and the listener. The mathematics for properly setting the balancing the sound for a particular location are well known, see for example, U.S. Pat. No. 5,798,922, "Method and apparatus for electronically embedding directional cues in two channels of sound for interactive applications," issued to Wood, et al on Aug. 25, 1998, incorporated herein by reference. The controller can be equipped with a user interface so that a user can enter the dimensions of the theater, and the speaker location.

When the system 100 is operating in Dolby mode, the controller can transition the sound from one speaker to another to aid in optimization the Dolby effect. This is useful when the speakers are not exactly in the prescribed arrangement because of the shape of the room or other factors. For instance, if the front, right speaker is too close to the TV, then the effect of sound coming from the right speaker might get lost when the observer moves to the right of that speaker. Transitioning the sound to the back, rear speaker can correct this. Correction is also possible when the display unit is non-stationary, for example, the listener is wearing a video headset. In this case, the camera may need to determine the rotation of the listener, i.e., if the listener turns, the deliver to the back, front, left, and right speakers needs to be reversed.

APPLICATIONS

The invention can also be applied to home stereo systems without a video display unit. The controller can also identify a particular listener and adjust sound delivery parameters such as volume, treble, and volume according to preferences of that listener. This could be particularly helpful to someone who was hearing impaired and needed extra volume or a boost in particular frequencies.

Although the invention works best for a single listener, it can also detect multiple listeners and adjust the sound according to the centroid of the group of listeners.

In a simple application, only the volume is adjusted. To obtain a high quality result phase and delay are adjusted as well, i.e., sound from a nearer loudspeaker needs to be sent slightly later to arrive at the user at the same time as the corresponding sound from a more distant loudspeaker.

While this invention has been described in terms of a preferred embodiment and various modifications thereof for several different applications, it will be apparent to persons of ordinary skill in this art, based on the foregoing description together with the drawing, that other modifications may also be made within the scope of this invention, particularly in view of the flexibility and adaptability of the invention whose actual scope is set forth in the following claims.

We claim:

1. A system for adjusting delivery of sound to loudspeakers, comprising:

a plurality of loudspeakers, located in an area and coupled to a sound generating source;

a camera oriented to acquire images of the area;

a controller, coupled to the camera and the sound generating source, identifying positions of the loudspeakers and a position of a listener in the area from the images, the controller automatically adjusting the sound according to the relative positions of the loudspeakers and the listener.

2. The system of claim 1 wherein the camera is calibrated.

3. The system of claim 1 wherein multiple cameras are used.

4. The system of claim 1 wherein the volume of the sound is adjusted.

5. The system of claim 1 wherein the phase and delay of the sound is adjusted.

6. The system of claim 1 wherein the sound is adjusted for multiple listeners.

7. The system of claim 1 wherein the sound generating source includes a video display unit.

8. A method for adjusting delivery of sound to loudspeakers, comprising the steps of:

positioning a plurality of loudspeakers coupled to a sound generating source in an area;

acquiring images of the area by a camera;

identifying positions of the speakers and a position of a listener in the area from the images using an image processing system coupled to the camera and the sound generating source;

adjusting sound according to the relative positions of the loudspeakers and the listener.

9. The method of claim 8 wherein the camera is calibrated.

10. The method of claim 8 wherein multiple cameras are used.

11. The method of claim 8 wherein the volume of the sound is adjusted.

12. The method of claim 8 wherein the phase and delay of the sound is adjusted.

13. The system of claim 8 wherein the sound is adjusted for multiple listeners.

* * * * *